US008473593B1

(12) United States Patent
Graham et al.

(10) Patent No.: US 8,473,593 B1
(45) Date of Patent: Jun. 25, 2013

(54) METHOD FOR DYNAMICALLY GENERATING INFORMATION OBJECTS BASED ON A RESTFUL SUBSCRIPTION REQUEST

(75) Inventors: Stephen G. Graham, Chapel Hill, NC (US); Thomas Maguire, Brewster, NY (US); Xiaotao Liu, White Plains, NY (US)

(73) Assignee: EMC Corporation, Hopkinton, MA (US)

( * ) Notice: Subject to any disclaimer, the term of this patent is extended or adjusted under 35 U.S.C. 154(b) by 820 days.

(21) Appl. No.: 12/241,829

(22) Filed: Sep. 30, 2008

(51) Int. Cl.
*G06F 15/173* (2006.01)
(52) U.S. Cl.
USPC .......................... 709/223; 709/203; 709/224
(58) Field of Classification Search
None
See application file for complete search history.

(56) References Cited

U.S. PATENT DOCUMENTS

| 6,057,757 | A * | 5/2000 | Arrowsmith et al. ......... 709/224 |
| 7,313,575 | B2 * | 12/2007 | Carr et al. ..................... 709/201 |
| 7,437,375 | B2 * | 10/2008 | Borthakur et al. ..... 707/999.101 |
| 7,546,335 | B2 * | 6/2009 | Moeller et al. ................ 709/203 |
| 7,587,450 | B2 * | 9/2009 | Morris .......................... 709/224 |
| 7,617,190 | B2 * | 11/2009 | Wright et al. ................. 709/223 |
| 7,620,697 | B1 * | 11/2009 | Davies .......................... 709/224 |
| 7,752,314 | B2 * | 7/2010 | Trevor et al. .................. 709/226 |
| 7,756,953 | B2 * | 7/2010 | Pulpatta et al. ............... 709/224 |
| 7,835,931 | B2 * | 11/2010 | Bayne ............................... 705/7 |
| 7,840,582 | B2 * | 11/2010 | Ponnappan et al. .......... 709/217 |
| 7,882,253 | B2 * | 2/2011 | Pardo-Castellote et al. .. 709/230 |
| 2005/0097146 | A1 * | 5/2005 | Konstantinou et al. ....... 707/200 |
| 2005/0102567 | A1 * | 5/2005 | McGuire et al. ................ 714/25 |
| 2006/0173985 | A1 * | 8/2006 | Moore .......................... 709/223 |
| 2007/0060325 | A1 * | 3/2007 | Gradek .......................... 463/29 |
| 2007/0226314 | A1 * | 9/2007 | Eick et al. ..................... 709/223 |

OTHER PUBLICATIONS

Lerner, Reuven. "At the Forge: Aggregating with Atom." Linux Journal. vol. 2004, Issue 127. Nov. 2004.*

* cited by examiner

*Primary Examiner* — Jeffrey R Swearingen
(74) *Attorney, Agent, or Firm* — Krishnendu Gupta; Gerald P. Kazanjian (57) ABSTRACT

Techniques disclosed herein describe a client and/or server process for managing Information Technology (IT) assets, such as servers and storage devices. The process dynamically generates customized information objects based on subscription requests. A client generates a request for information. The request specifies information associated with a specific managed entity or IT resource. A server that monitors the specific managed entity does not maintain such information in an existing information object. Information associated with the specific managed entity can be performance information, health information, usage information, and the like. A notification manager receives the request and identifies that existing subscription resources don not contain the requested information. The notification manager generates a new information object that contains the requested information, and notifies the client.

17 Claims, 8 Drawing Sheets

METHOD FOR DYNAMICALLY GENERATING INFORMATION OBJECTS BASED ON A RESTFUL SUBSCRIPTION REQUEST

RELATED APPLICATION

None.

BACKGROUND

Information technology is the study, design, development, implementation, support or management of computer-based information systems, particularly software applications and computer hardware. IT deals with the use of electronic computers and computer software to convert, store, protect, process, transmit, and securely retrieve information.

Information technology (IT) service management is an area that includes, at least in part, managing IT systems. IT resource management platforms enable IT managers to view resource information, such as health and performance, from several sources including routers, switches, servers, host computers, applications, storage networks, and so forth. For example, a user managing an IT system can use a resource management platform to query what content is on a specific server, or query a current capacity of a specific server, receive messages from IT assets, filter and organize IT asset information, etc.

SUMMARY

Enterprises and business organizations often have systems or notification mechanisms for monitoring and managing IT assets. Such systems typically use a complicated messaging system that uses specific protocols and programming interfaces to manage IT assets and receive notifications associated with those IT assets. A server-side resource manager is typically located near IT assets and has very specific and efficient protocols to get information on multiple IT assets and information sources. For example, some enterprise systems use Java Message Service (JMS) Application Programming Interface (API) as a messaging protocol to allow enterprise system components to create, send, receive, and read messages. As the name implies, there is substantial, complex application programming involved with lower level protocols of enterprise-level systems.

IT Service management systems can operate on both the client side and the server side. Systems operating on either side have challenges. One example challenge on the client side, is an IT service management system that desires to get information on various manageable entities on the server side. The challenge is that the client, from a security standpoint, may not have access to entities on the server side. It is common for server systems to provide information on manageable entities using a push model. In other words, data transactions originate from the server. Using pull technology for clients to have access to server-side entities can mean opening undesirable holes in a firewall. Thus, the challenge relates to the client receiving asynchronous notifications about information change on various manageable entities.

An additional challenge is the complexity of dealing with lower level protocols for accessing information, such as the health of a server. Dealing with such a messaging service is too complicated for a client program to address, as this will burden the client program and users. This is especially relevant for web client applications used for accessing information about IT systems.

One way web clients access web resources is through web or network resources such as Atom feeds and XMLHttpRequest (Extensible Markup Language Hypertext Transfer Protocol) objects. An Atom feed is typically created by a server. The feed is a stream of data or information of interest. Atom feeds are largely used to download updates to websites, blogs, and news. A server generates one or more feeds, and a client can select or subscribe to a feed. In other words, Atom feeds can be used to represent changes to a fixed, static resource. Users are limited to Atoms feeds that a server offers.

XMLHttpRequest objects are used with Ajax, which is a group of interrelated web development techniques used for creating interactive web applications or rich Internet applications. Ajax allows web applications to interactively access additional web resources in response to user actions, without having to redraw or download an entire web page. These resources are known as XMLHttpRequest objects, and a user accesses or calls these resources based on actions in a web client. For example, in a web-based mapping interface, dragging a map within a frame to see more of the map in one location, calls XMLHttpRequest objects to supply that information. In general, these objects already exist on the server and are retrieved in response to user actions.

Techniques discussed herein significantly overcome the deficiencies of IT service management solutions. For example, as will be discussed further, certain specific embodiments herein are directed to a client and/or server method for managing IT assets. Such IT service management solutions can be used for obtaining customized information on an entity.

More specifically, according to one embodiment, a client generates a request for information. The request specifies information associated with a specific managed entity that a server, monitoring the specific managed entity, does not maintain in an existing information object. Information associated with the specific managed entity can be performance information, health information, usage information, and the like. For example, a notification manager maintains an information object to notify a client when servers in a network are at 95% capacity. The client, however, requests information on when a server is at 97% capacity. In this example, the 97% capacity indication might seem arbitrary and the notification manager does not maintain an information object for this specific information. Managed entities can be any device or application accessible over a network. For example, managed entities can include servers, switches, routers, network hubs, and storage arrays.

The client submits the request for information to the server. The server operates a resource manager that dynamically generates, or is capable of generating, a new information object to provide to the client in response to the request for information. The information object can be any set of data, information, web resource. For example, a uniform resource locator, an image file, a text file, an Atom feed, an XMLHttpRequest object, and the like.

The client then receives the new information object. The new information object contains the information specified in the request for information associated with the specific managed entity. The new information object can include a resource identifier that can be periodically probed to see if the new information is available. Alternatively, the client first receives a resource identifier or locator that can be periodically polled or probed to identify whether the new information object is available for retrieval.

According to one embodiment, a notification manager provides multiple information objects accessible by a client. Each information object contains information associated with a specific managed entity. The notification manager can make available the information objects in multiple ways. For example, the notification manager can provide a resource identifier to the client, or the notification manager can transmit information objects to the client at specified intervals. Alternatively, the notification manager can provide a publish-subscribe environment where the client can select an information object, or a type of information object, and then receive a resource identifier to access the information object and to check for updates to the information object.

The notification manager receives a request for information. The request specifies information associated with a specific managed entity that a resource manager does not maintain in an existing information object. The resource manager, however, monitors the specific managed entity. For example, a resource manager monitors and detects or collects information from a specific managed entity such as a server. From the collected information, resource manager provides multiple types or categories of information objects, with each information object containing certain information (or updates to certain information) associated with a specific managed entity.

If the request for information specifies information that does not currently exist in an existing information object, then the notification manager dynamically generates a new information object accessible to the client. The new information object contains information specified in the request for information associated with a specific managed entity. In response to a client request, the notification manager transmits the new information object to the client.

Techniques disclosed herein are useful for obtaining specific information, from information objects, that a client requires or desires. An example advantage, is that a client can customize or tailor the creation of information objects and resources to meet a client's need. Another example advantage is that a web-based client can receive customized information about a specific managed entity without compromising security of the network. Another example advantage is providing a simple, easily configurable, IT service management application, in that clients can received customized notifications on IT assets without forcing or requiring clients to use specific or proprietary protocols, and specific or proprietary application programming interfaces. In other words, without using low-level protocols, a client describes a specific type of feed that the client would like to receive. The notification manager recognizes that the notification manager can produce that type of feed, and so the notification manager provides a new, customized feed.

In another embodiment, the notification manager uses a publish-subscribe communications protocol to make available, or provide, information objects to clients. The notification manager, or the resource manager, publishes information objects by enabling the client to access the information objects through a subscription. Such a communications protocol can use an asynchronous communications protocol for receiving subscription requests and transmitting information objects without using a separate messaging layer. In other words, the notification manager can use a network architecture to define and address resources, and to transmit domain-specific data over a network communications protocol without an additional messaging layer such as SOAP or session tracking via HTTP (Hypertext Transfer Protocol) cookies, that provides a messaging framework.

In one embodiment, the notification manager can provide multiple Atom-based feeds or XMLHttpRequest objects accessible by client Web application. The request for information can then be the request for a subscription to a customized Atom-based feed. The notification manager can identify that existing Atom-based feeds do not contain the specified information associated with a specific managed entity, and then dynamically creates a new Atom-based feed customized to the requested subscription. The resource manager can either begin collecting new information, or filter events or existing information to identify the requested information.

Yet other embodiments herein include software programs to perform the steps and operations summarized above and disclosed in detail below. The notification process can be a stand alone software application and process, or may be a web-based application or even a web service. One such embodiment comprises a computer program product that has a computer-storage medium (e.g., a tangible computer readable media, disparately located or commonly located media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Also, it is to be understood that each of the systems, methods, and apparatuses herein can be embodied strictly as a software program, as a hybrid of software and hardware, or as hardware alone such as within a processor, or within an operating system or within a software application, or via a non-software application such as a person performing all or part of the operations. Example embodiments of the invention may be implemented in products and/or software applications such as those manufactured by EMC Corporation of Hopkinton, Mass., USA.

As discussed above, techniques herein are well suited for use in software applications supporting IT service management. It should be noted, however, that embodiments herein are not limited to use in such applications and that the techniques discussed herein are well suited for other services applications such as those where dynamic customization of notifications is beneficial.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein describe an event notification system and method that is useful in IT service management environments. The system can provide a web-based interactive approach and/or RESTful approach to client/system interaction. RESTful refers to representational state transfer (REST). This is a style of software architecture for distributed hypermedia systems such as the World Wide Web. REST includes a collection of network architecture principles which outline how resources are defined and addressed. The term can be used to describe any simple interface which transmits domain-specific data over HTTP without an additional messaging layer such as SOAP or session tracking via HTTP cookies.

Figure 1:
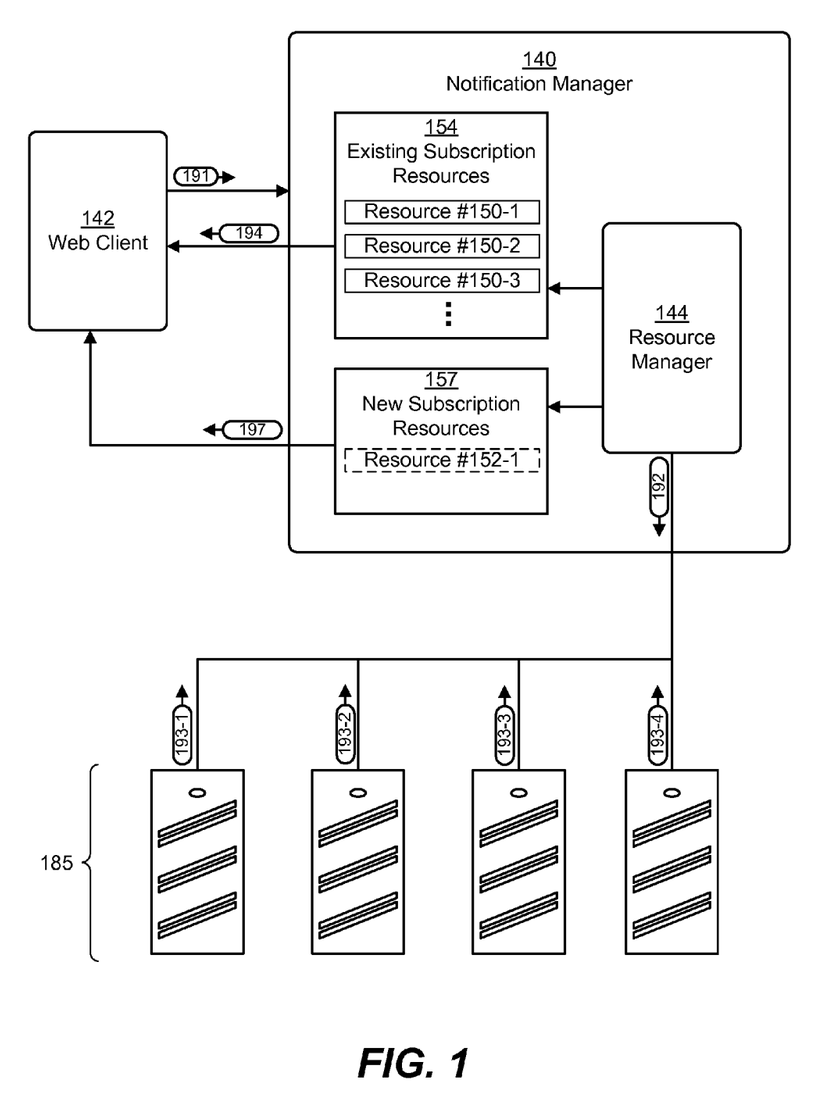
FIG. 1 is an example diagram of a notification manager for providing resources in a computer/network environment according to embodiments herein.

Operating in a publish-subscribe channel, techniques disclosed herein provide a method to define context of interest and automate generation of or creation of network resources. Clients can request information or resources to be made available from an IT resource management platform by specifying an event pattern or by specifying how to filter on such a request. Additionally, techniques disclosed herein describe a mechanism by which an asynchronous message exchange between a client and an IT resource management platform can be customized or user-generated, by specifying an event pattern or filter on an information request that generates a tailored information object Now, more specifically, FIG. 1 is an example diagram of a notification manager for providing resources and a computer/network environment according to embodiments herein. Client 142 can be any computer or application for accessing a network. For example, the client 142 can be a web client, Internet browser or similar communication application. Client 142 sends a subscribe message 191 to notification manager 140. A subscribe message, for example, can be a simple HTTP POST of a subscription request. Alternatively, request 191 can be a protocol specific request to create a subscription. A protocol specific request is useful when working in a JMS (Java messaging system) or WS-Eventing (Web services eventing) environment.

Notification manager 140 maintains existing subscription resources 154. In FIG. 1, such resources are identified as "Resource #150-1," "Resource #150-2", and "Resource #150-3." Such resources are information objects that contain information associated with one or more of managed entities 185. Such resources can be IT resources managed in a data center, web resources, or any information object. When request for information 191 specifies information associated with a specific managed entity 185 that exists in existing subscription resources 154, then notification manager 140 transmits information 194 to client 142. Information 194 can include information about existing subscription resources 154.

The system also includes resource manager 144. Resource manager 144 communicates with one or more manageable entities 185. Manageable entities 185 can include any network accessible device or application that can be managed or monitored. For example, manageable entities 185 can include host devices, applications, storage devices, network devices, etc. Resource manager 144 can discover manageable entities 185 and monitor status of such entities. For example resource manager 144 can monitor health, performance, capacity or any number of metrics.

Resource manager 144 detects events or actions associated with a set of manageable entities 185. Resource manager 144 can filter and translate such events into existing subscription resources 154, or new subscription resources 157, for notification manager 140 to publish. Alternatively, resource manager 144 operates with notification manager 140 to filter and translate such events into subscription resources. Upon receipt of events or actions, notification manager 140 identifies whether any client subscription is associated with the events or actions. Notification manager 140 can modify existing subscription resources 154, or new subscription resources 157, to cause an event notification 194 or 197 to be made available to client 142.

There are different types of information objects. Traditionally, Atom feeds are static. Typically, Atom feeds represent changes to a fixed, static resource. RSS (Really Simple Syndication) is a family of Web feed formats playing a role similar to ATOM. RSS (and ATOM) can be used to publish frequently updated works such as blog entries, news headlines, audio, and video in a standardized format. XMLHttpRequest objects are resources that are created by a Web server and accessible by a client. XMLHttpRequest is part of Ajax (asynchronous JavaScript and XML (Extensible Markup Language)) techniques, which are a group of interrelated web development techniques used for creating interactive web applications or rich Internet applications.

Client 142 can subscribe to notifications using several variants such as a native enterprise service bus (ESB) message consumer, XMLHttpRequest (Ajax) consumer, Atom feed consumer, WS-Eventing, and so forth.

Using the Ajax variant, client 142 creates a subscription by sending a POST of a subscribe (subscription creation message) to {url to VS}/Notification/{destination name}/AJAX, where {destination name} is a destination defined by notification manager 140.

The subscription message 191 can be a text/xml message. The subscription can include a filter expression, using a regular expression on properties that may appear in notification messages associated with a given topic. The syntax of the filter can be any expression. For example, the expression can combine functionality similar to JMS property selector syntax and some form of content-based filtering expression in some Xpath (XML Path Language) based syntax.

An Ajax subscription resource can respond with a text/xml response containing a Uniform Resource Identifier (URI) to an XMLHttpRequest-capable resource created in response to the subscription message, such as in transmitting information 194 to client 142.

Client 142 can use conventional Ajax programming (open( ) and send( ) techniques to periodically probe for readystatechange events on the XMLHttpRequest object. Notification manager 140 is responsible for changing the readystate of the XMLHttpRequest object when there are new notifications that match the destination and filter patterns specified in subscription message 191.

Client 142 can also terminate the Ajax resource created by the notification manager 140, in support of its subscription, by issuing a DELETE to the URL of the XMLHttpRequest-capable resource created in support of its subscription. If the notification manager 140 does not receive timely readystatechange requests, then the notification manager 140 can arbitrarily cancel the XMLHttpRequest-capable resource associated with the client's subscription. Notification manager 140 can configure any threshold as a basis for identifying timely readystatechange requests.

Using the Atom variant, the client 142 can POST a subscription message to

{url to VS}/Notification/{destination name}/ATOM, where {destination name} is a destination defined by the notification manager 140.

The subscription message can be a text/xml message. The subscription can include a filter expression, using a regular expression on the properties that may appear in the notification messages associated with a given topic. The syntax of the filter can be any expression, and can combine functionality similar to a JMS property selector syntax and some form of content-based filtering expression in some XPath inspired dialect.

An Atom subscription resource can respond with a text/xml response containing a URI to an Atom feed resource created in response to the subscription message 191.

Client 142 can use an Atom feed reader or other application using Atom-based protocols to periodically poll the Atom resource for new content. Notification manager 140 updates the Atom resource with new Atom entries when there are new notifications that match the destination and filter patterns specified in the subscription message 191.

Client 142 can terminate the Atom resource created by the notification manager 140 in support of its subscription, by issuing a DELETE to the URL of the Atom resource. If the notification manager 140 does not receive timely poll requests, then the notification manager 140 can optionally cancel a selected Atom feed resource associated with the client's 142 subscription.

As an example, described below are notification use cases for Ajax related resources and Atom related resources. Notification related use cases are concerned with subscribers describing types of the events or information in which the subscribers are interested in being notified, and how subscribers are notified.

In the Ajax example, the client desires to subscribe to creation of a resource. That is, client 142 desires to be notified of a new information object of a specific type that can be discovered by resource manager 144. Client 142 creates a subscription for such events by sending a POST to {url to VS}/Notification/ResourceLifecycle/AJAX with a filter expression as content of the text/xml body of the post.

Below is an example filter expression:
<filter>
class=Host
messageType=ResourceCreation
</filter>

The filter expression above is for illustration purposes only. In one embodiment, the filter expression can use a subset of XML Path Language (XPath) 2.0 syntax to describe a message pattern received in a subscription request. Notification manager 140 can respond with a URI to a Web resource capable of supporting a XMLHttpRequest interaction pattern used in Ajax-based technologies. Client code can set up a Ajax-based interaction, periodically querying a readystatechange property of a resource or information object to see if notification manager 140 published new notifications to the resource.

When resource manager 144 discovers a new manageable entity 185, then resource manager 144 informs notification manager 140. The body of this message can contain an XML representation of the newly created resource. Notification manager 140 updates the XMLHttpRequest resource created in response to the subscription, with a new notification message. This step essentially sets the readystatechange property of the XMLHttpRequest capable resource to a ready value.

Client 142, upon detection of the readystatechange of the XMLHttpRequest capable resource, uses Ajax-based programming techniques to retrieve the notification message. If client 142 wants more details about the resource than just a URI contained in the notification message, then client 142 can retrieve an XML representation of the resource by issuing a GET on the URI contained in the notification message.

In subscribing to a state change, client 142, has acquired a URL to a subscription resource. The client 142 desires to be notified of any change to the state of the chosen Subscription resource. The client 142 creates a subscription for such events by creating a subscription using one of the subscription variants provided by notification manager 140. The client 142 sends a POST to {url to VS}/Notification/ResourceLifecycle/AJAX with a filter expression as content of the text/xml body of the post An example expression is:
<filter>
id=http://sgg.com/lab1/classes/Host/lswk5013.lss.emc.com
</filter>

Notification manager 140 responds with a URI to a Web resource capable of supporting the XMLHttpRequest interaction pattern used in Ajax. Client code can set up an Ajax-based type of interaction, periodically querying the readystatechange property of the resource to see if there have been new notifications submitted to the resource.

Notification manager 140 receives raw resource lifecycle events from the resource manager 144. If a notification matches a filter pattern described in the subscription request, then the readystatechange property of the XMLHttpRequest capable resource is set to the ready value.

Client 142, on detection of the readystatechange of the XMLHttpRequest capable resource, uses Ajax-based programming techniques to retrieve a notification message. Client 142 can examine changes to resources by examining content of a notification message.

Client 142 can subscribe to state changes.

The client 142 can acquire a URL to a subscription resource. Client 142 then indicates a desire or need to be notified of any change to the state of the chosen subscription resource that meets a certain pattern. For example, the pattern is a number of applications that have increased.

In this case, client 142 is looking for notification when a host Application relationship is inserted for a given subscription resource. Client 142 creates a subscription for these events by sending a POST to
{url to VS}/Notification/RelationshipLifecycle/AJAX
with a filter expression as content of the text/xml body of the post Below is example content:
<filter>
messageType="RelationInsertion"
relnName="hostsApplication" AND
id=http://sgg.com/lab1/classes/Host/lswk5013.lss.emc.com
OR
id2=http://sgg.com/lab1/classes/Host/
lswk5013.lss.emc.com
</filter>

Notification manager 140 responds with a URI to a Web resource capable of supporting an XMLHttpRequest interaction pattern used in Ajax-based technologies, and the use case continues in a fashion similar to that described in the previous use case.

Client 142 can subscribe to deletion of a given resource type. Client 142 may desire to be notified of when any resource of type host is deleted and this deletion is "detected" by any of the resource managers known to the system. Client 142 creates a subscription for these events by sending a POST to
{url to VS}/Notification/ResourceLifecycle/AJAX
with a filter expression as content of the text/xml body of the post. For example:
<filter>
class=Host
messageType="ResourceDeletion"
</filter>

Notification manager 140 can respond with a URI to a Web resource capable of supporting the XMLHttpRequest interaction pattern used in Ajax-based technologies, and the use case continues in a pattern similar to that described in the previous use case.

Client 142 can subscribe to deletion of a given specific resource. Client 142 acquires a URL to a subscription resource. The client wishes to be notified if a chosen subscription resource is deleted. Client 142 can create a subscription for these events by sending a POST to
{url to VS}/Notification/ResourceLifecycle/AJAX
with a filter expression as content of the text/xml body of the post. For example:
<filter>
messageType=ResourceDeletion
id=http://sgg.com/lab1/classes/Host/lswk5013.lss.emc.com
</filter>

Notification manager 140 can respond with a URI to a Web resource capable of supporting the XMLHttpRequest interaction pattern used in Ajax-based technologies.

Using the Atom variant, client 142 creates a subscription for events by sending a POST to:
{url to VS}/Notification/ResourceLifecycle/ATOM
with a filter expression as content of the text/xml body of the post. For example:
<filter>
class=Host
messageType=ResourceCreation
</filter>

The filter expression above is for illustration purposes only. In one embodiment, the filter expression can use a subset of XPath 2.0 syntax to describe the pattern of message expected in the subscription.

Notification manager 140 creates a new Atom feed document, as new subscription resource 157, and responds with a URI to this newly created Atom feed document. New subscription resource 157 is shown with a newly created Resource #152-1. When resource manager 144 discovers a new manageable entity 185, resource manager 144 informs notification manager 140. The body of this message can contain an XML representation of the newly created resource. Notification manager 140 updates the Atom feed document associated with the subscription with a new entry, containing the representation of the newly created resource.

Client 142 can periodically probe for updates to the Atom feed document (for example, the URL used in the "next" link (see RFC 5005 Atom Archiving and Pagination) could be an XMLHttpRequest capable resource and the client can use Ajax programming to probe for updates on the "next" link).

In subscribing to state change, client 142 acquires a URL to a subscription resource. The client 142 desires to be notified of any change to the state of the chosen subscription resource. Client 142 creates a subscription for these events by creating a subscription using one of the subscription variants provided by notification manager 140. The client can send a POST to
{url to VS}/Notification/ResourceLifecycle/ATOM
with a filter expression as content of the text/xml body of the post. For example:
<filter>
id=http://sgg.com/lab1/classes/Host/lswk5013.lss.emc.com
</filter>

Notification manager 140 creates a new Atom-based feed document and responds with a URI to this newly created Atom-based feed document.

Notification manager 140 receives raw resource lifecycle events from resource manager 144. If a notification matches a filter pattern described in the subscription request, then notification manager 140 updates the Atom-based feed document, associated with the subscription, with a new entry, containing a representation of the subscription resource that changed, and some representation of the nature of the state change.

Client 142 can periodically probe for updates to the Atom-based feed document (for example, the URL used in the "next" link (see RFC 5005 Atom Archiving and Pagination) could be an XMLHttpRequest capable resource and the client could use Ajax-based programming to probe for updates on the "next" link).

In filtering subscriptions to state change, client application 142 has acquired a URL to a subscription resource. Client 142 desires to be notified of any change to the state of a selected managed entity that meets a certain pattern, for example a number of applications has increased.

In this case, client 142 is looking for notification when a "hostsApplication" relationship is inserted for the given managed entity. Client 142 creates a subscription for these events by sending a POST to
{url to VS}/Notification/RelationshipLifecycle/ATOM
with a filter expression as content of the text/xml body of the post. For example:
<filter>
messageType="RelationInsertion"
relnName="hostsApplication" AND
id=http://sgg.com/lab1/classes/Host/lswk5013.lss.emc.com
OR
id2=http://sgg.com/lab1/classes/Host/
lswk5013.lss.emc.com
</filter>

Notification manager 140 can create a new Atom-based feed document and respond with a URI to this newly created Atom-based feed document and the use case continues in a similar pattern.

In subscribing to deletion of a given subscription type, client 142 desires to be notified of any resource of type host is deleted and this deletion is "detected" by resource manager 144. Client 142 creates a subscription for these events by sending a POST to
{url to VS}/Notification/ResourceLifecycle/ATOM
with a filter expression as content of the text/xml body of the post. For example:
<filter>
class=Host
messageType="ResourceDeletion"
</filter>

Notification manager 140 then creates a new Atom-based feed document and responds with a URI to this newly-created Atom feed document.

Client 142 can subscribe to deletion of a given specific subscription resource. Client application 142 acquires a URL to a subscription resource. Client desires to be notified if chosen subscription resource is deleted. Client 142 creates a subscription for these events by sending a POST to
{url to VS}/Notification/ResourceLifecycle/ATOM
with a filter expression as content of the text/xml body of the post. For example:
<filter>
messageType=ResourceDeletion
id=http://sgg.com/lab1/classes/Host/lswk5013.lss.emc.com
</filter>

Notification manager 140 creates a new Atom-based feed document and responds with a URI to this newly created Atom-based feed document.

In an example use case for an Atom-based feed, a server such as notification manager 140 typically creates the Atom-based feed. The feed is a stream of data or information of interest. An IT service manager monitors multiple servers or other IT assets from a client. IT service manager decides that IT service manager wants a feed on all servers having over 95% processor utilization. This number can be considered arbitrary. Another IT service manager might want to know when utilization is at 93%, while yet another wants to keep a pulse on processors at 98.6%. While conventional IT resource managers do not maintain Atom feeds, if resource managers, monitoring the servers, did maintain an Atom feed, such Atom feeds would most likely not provide server utilization data for arbitrary percentages. In conventional Atom feeds, the client has no ability to influence the Atom feed. If the IT service manager polls for feeds on 100 servers and then must do filtering on the client side to determine which server is 99% utilized, then such client-side processing creates a great network load, and application load on the client/server.

In this example use case, according to techniques disclosed herein, client 142 expresses or defines a desired feed, and the server, or notification manager 140, creates the desired feed. Such a request can be executed using, for example, an XML query language. Client 142 can request notification manager 140 to provide an Atom feed with a specific type of entry, or request to filter events on a specific expression. In another example request, client 142 requests that notification manager 140 combine Atom feeds, by using complicated relationship traversal mechanisms. By way of a non-limiting example, client 142 asks for notification on all servers having CPU utilization over 99% AND that are running customer order applications. Such an additional qualification is a powerful type of Atom feed to be able to consume and then quickly produce. This is different from the client application receiving an Atom feed of all servers, executing internal processing (which servers are 99% CPU utilized), and then using an additional API that queries an overused server about what applications are running on the server, and then processing that list of applications.

In a client 142, by way of a non-limiting example, a client web application might use a graphical user interface that displays icons or pictures of a server. An IT service manager, using that graphical interface, wants a server icon to graphically appear red if local disk space exceeds 95% capacity. Client 142 can send a customized XMLHttpRequest to notification manager 140 that tells notification manager 140 characteristics that should be in a web resource corresponding to the customized XMLHttpRequest.

Figure 2:
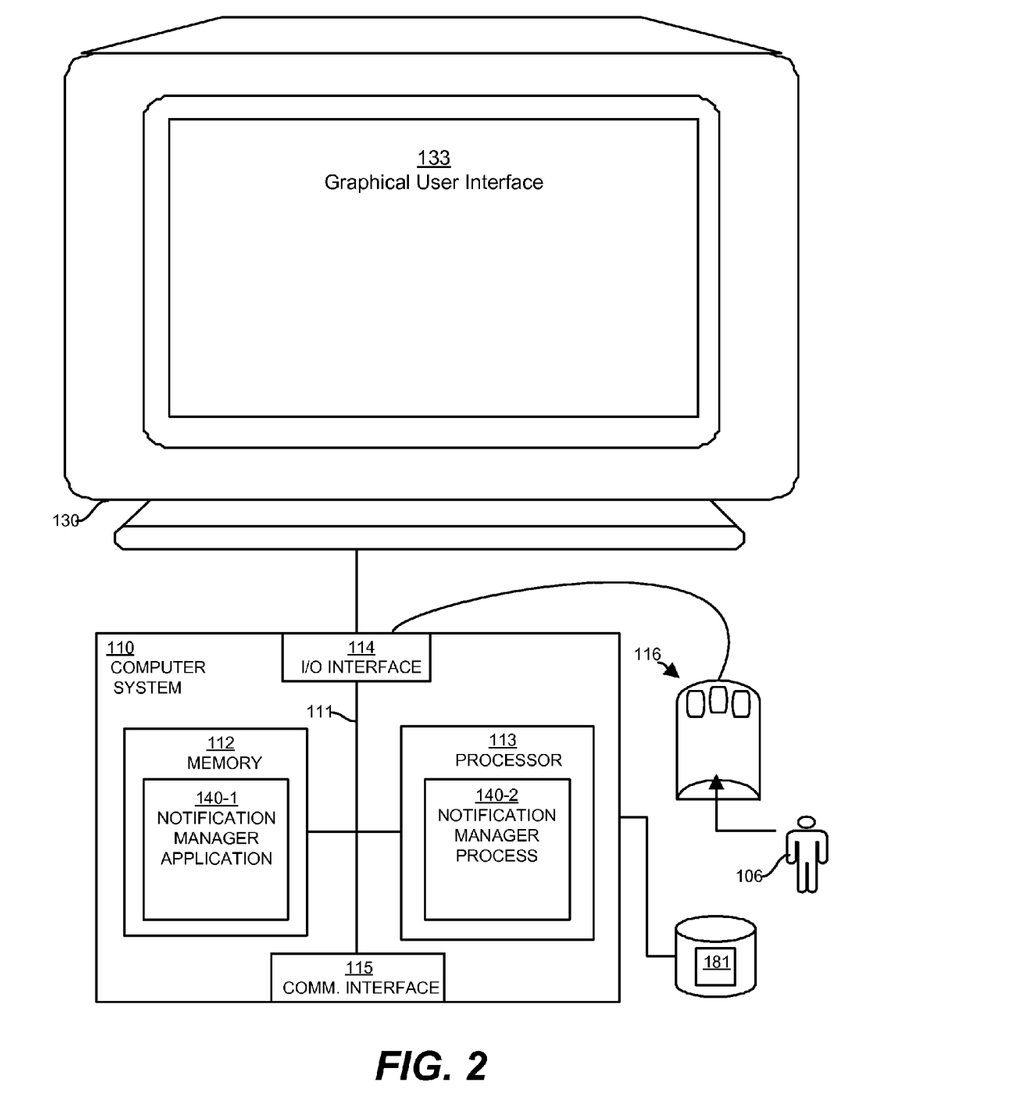
FIG. 2 a high level diagram of the computing environment in which embodiments of the invention operate.

FIG. 2 is a block diagram of an example architecture of a respective computer system 110 such as one or more computers, processes, etc., for implementing a notification manager 140 according to embodiments herein. Computer system 110 can include one or more computer devices such as personal computers, servers that make up a website, workstations, portable computing devices, consoles, network terminals, networks, processing devices, etc.

In FIG. 2, computer system 110 is shown connected to display monitor 130 for displaying a graphical user interface 133 for a user 106 to make customized subscription requests using input devices 116. Repository 181 can optionally be used for storing subscription resources 154 and 157. Input devices 116 can include one or more devices such as a keyboard, computer mouse, etc.

Note that the following discussion provides a basic embodiment indicating how to carry out functionality associated with the notification manager 140 as discussed above and below. However, it should be noted that the actual configuration for carrying out the notification manager 140 can vary depending on a respective application. For example, as previously discussed, computer system 110 can include one or multiple computers that carry out the processing as described herein.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the notification manager 140 of computer system 110 to communicate over a network and, if necessary, retrieve any data required to create views, process content, communicate with a user, etc. according to embodiments herein.

As shown, memory system 112 is encoded with notification manager application 140-1 that supports functionality as discussed above and as discussed further below. Notification manager application 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the notification manager application 140-1. Execution of the notification manager application 140-1 produces processing functionality in notification manager process 140-2. In other words, the notification manager process 140-2 represents one or more portions of the notification manager 140 performing within or upon the processor 113 in the computer system 110.

It should be noted that, in addition to the notification manager process 140-2 that carries out method operations as discussed herein, other embodiments herein include the notification manager application 140-1 itself (i.e., the un-executed or non-performing logic instructions and/or data). The notification manager application 140-1 may be stored on a tangible computer readable medium or any other computer readable media such as floppy disk, hard disk, optical medium, etc. According to other embodiments, the notification manager application 140-1 can also be stored in a memory type system such as in firmware, read only memory (ROM), or, as in this example, as executable code within the memory system 1012.

In addition to these embodiments, it should also be noted that other embodiments herein include the execution of the notification manager application 140-1 in processor 113 as the notification manager process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with notification manager 140 will now be discussed via flowcharts in FIG. 3 through FIG. 8. For purposes of the following discussion, the notification manager 140, client 142, or other appropriate entity performs steps in the flowcharts.

Figure 3:
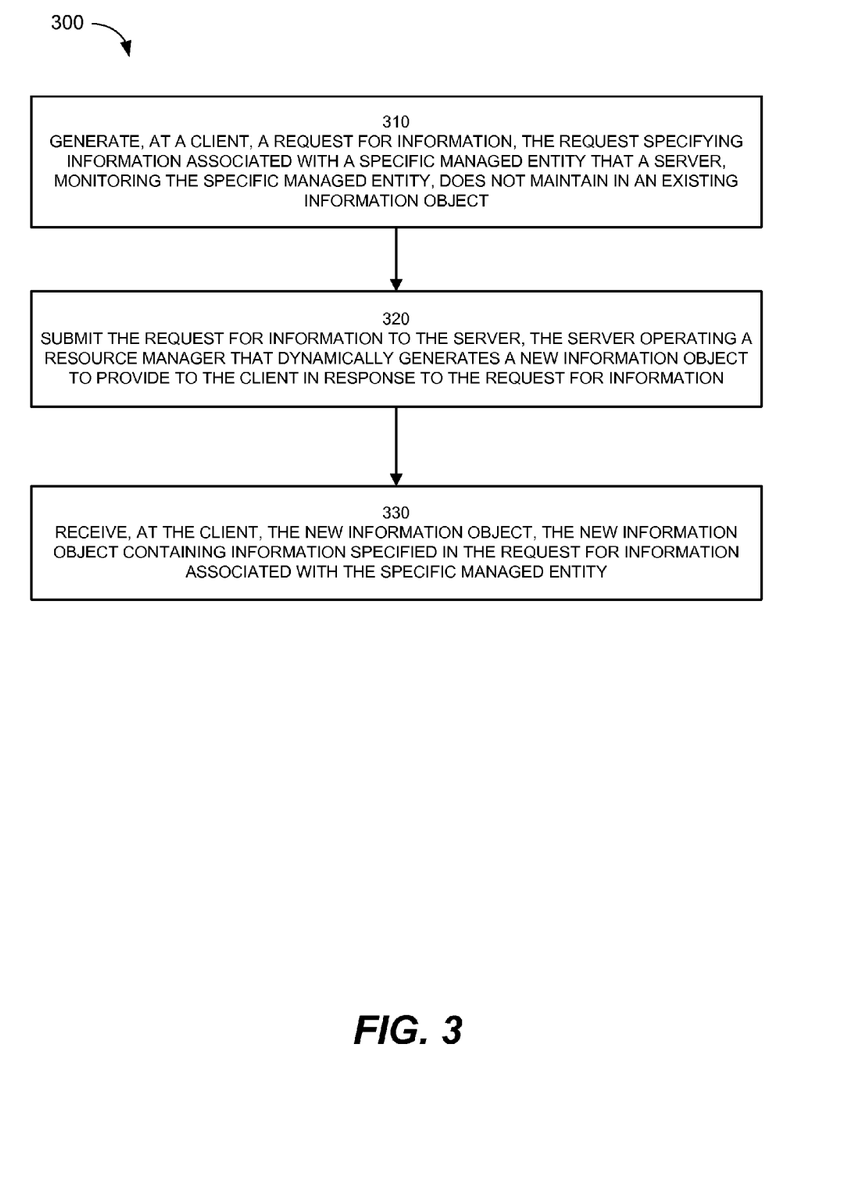
FIG. 3 is a flowchart illustrating an example method for obtaining information on an entity according to embodiments herein.

More particularly, FIG. 3 is an example flowchart 300 illustrating operations associated with notification manager 140 according to embodiments herein. Note that flowchart 300 of FIG. 3, subsequent flow charts, and corresponding text below may overlap with, refer to, and expand on some of the matter previously discussed with respect to FIGS. 1-2. Also, note that the steps in the below flowcharts need not always be executed in the order shown.

In step 310, client 142 generates a request for information 191. The request specifies information associated with one or more specific managed entities 185 that a server, monitoring the specific managed entity, does not maintain in an existing information object.

In step 320, client 142 submits the request for information to the server or notification manager 140. Notification manager 140 operates resource manager 144 that dynamically generates a new information object or subscription resource 157 to provide to client 142 in response to the request for information.

In step 330, client 142 receives the new information object 157, the new information object 157 contains information specified in the request for information associated with the specific managed entity, or the new information object 157 contains information about how to retrieve information about the managed entity, such as a resource identifier. By way of a non-limiting example, this identifier could be a uniform resource identifier (URI), uniform resource locator (URL), identifier for an Atom, XML, or RSS file type (.atom, .xml, .rss, respectively), or the like.

Figure 4:
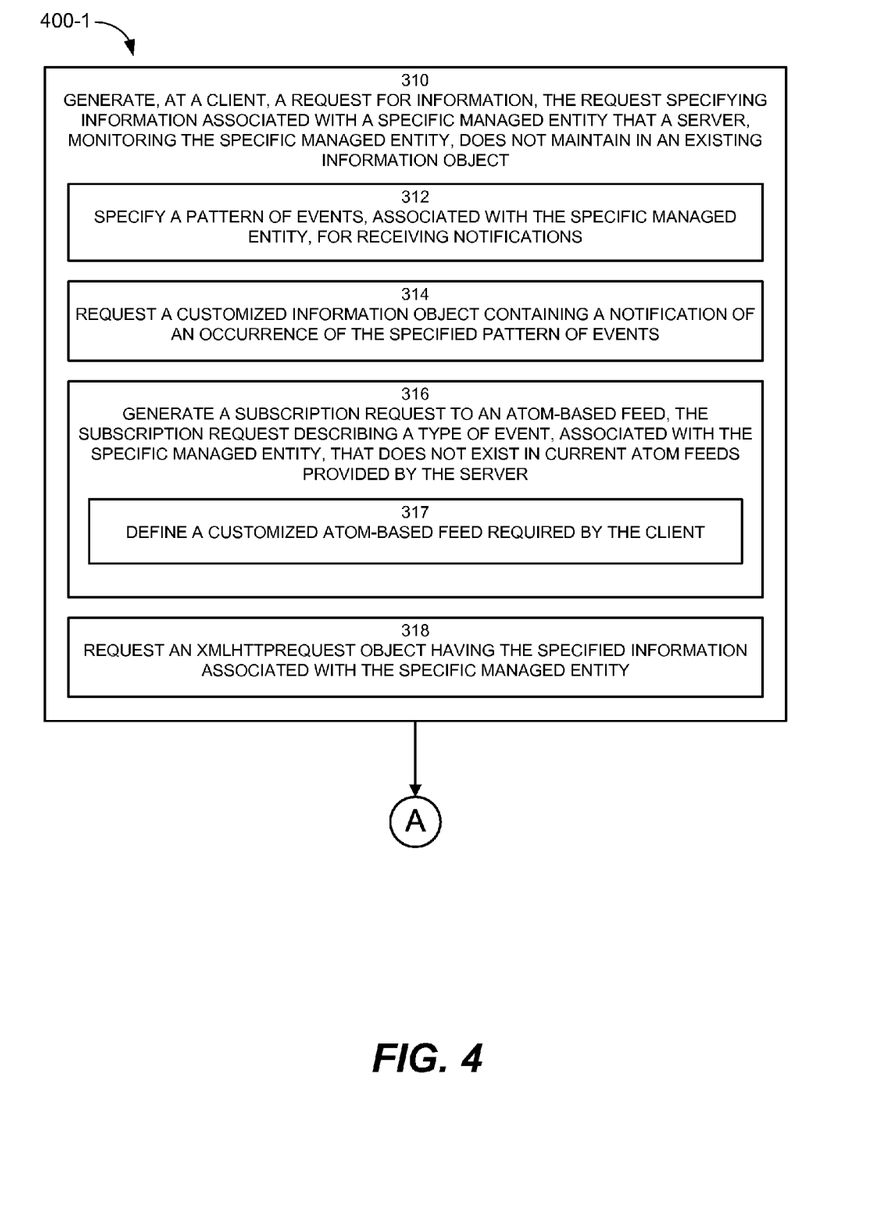
FIGS. 4-5 are a flowchart illustrating an example method for obtaining information on an entity according to embodiments herein.
Figure 5:
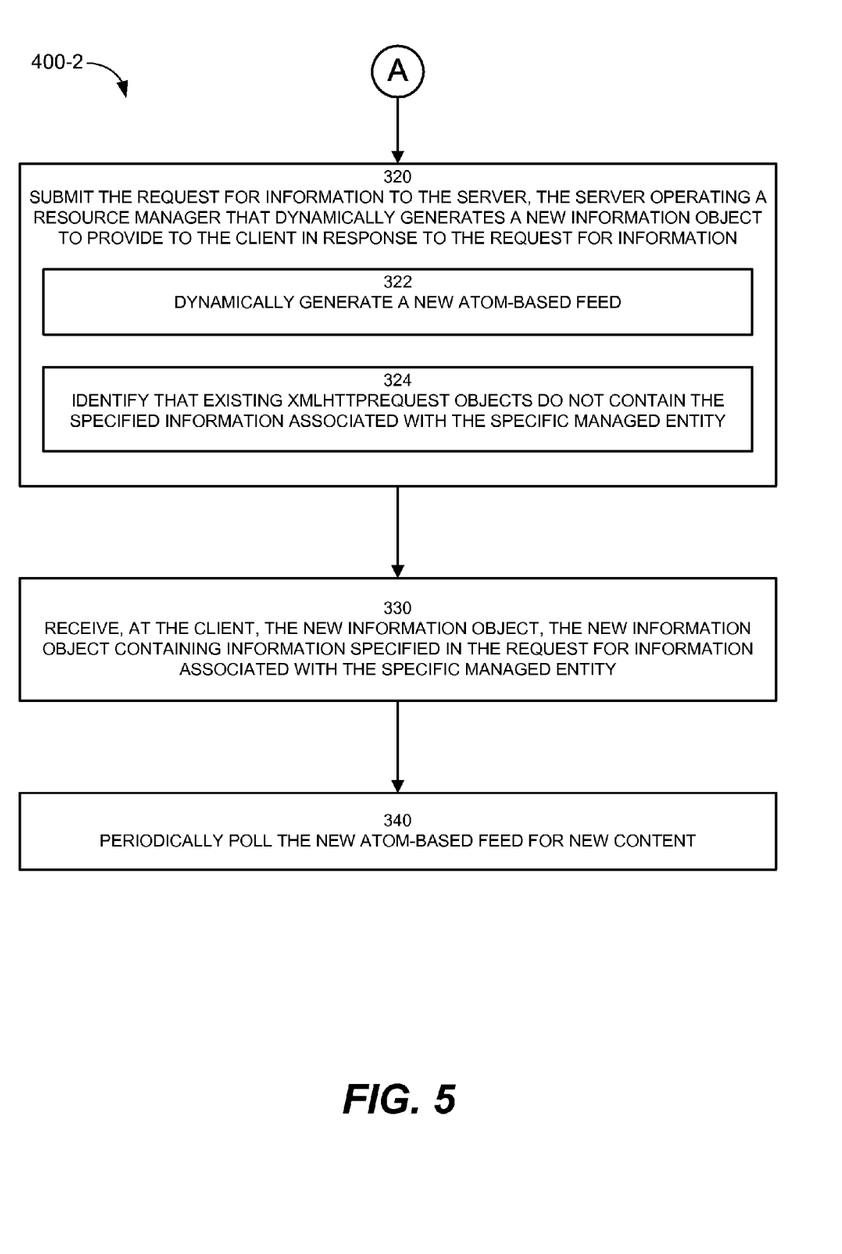

FIGS. 4 and 5 show example flowchart 400 that expands on flowchart 300 by illustrating operations associated with a notification manager according to embodiments herein.

In step 310, client 142 generates a request for information 191. The request specifies information associated with a specific managed entity 185 that a server, monitoring the specific managed entity, does not maintain in an existing information object. In step 312, client 142 specifies a pattern of events, associated with the specific managed entity 185, for receiving notifications 197. In step 314, client 142 requests a customized information object containing a notification of an occurrence of the specified pattern of events.

In step 316, client 142 generates a subscription request, 191 to an Atom-based feed. The subscription request 191 describes a type of event, associated with the specific managed entity 185, but that does not exist in the current Atom-based feeds provided by the server or by notification manager 140. In step 317, client 142 defines a customized Atom-based feed required by client 142. Step 318, client 142 requests an XML http request object having the specified information associated with a specific managed entity 185.

In step 320, client 142 submits the request for information to the server or notification manager 140. Notification manager 140 operates resource manager 144 that dynamically generates a new information object or subscription resource 157 to provide to client 142 in response to the request for information. In step 322, notification manager 140 dynamically generates a new Atom-based feed. In step 324, notification manager 140 identifies that existing XML http request objects, and/or Atom-based feeds, do not contain the specified information associated with a specific managed entity 185.

In step 330, client 142 receives the new information object 157, the new information object contains information specified in the request for information associated with the specific managed entity.

In step 340, client 142 periodically polls the new Atom-based feed for new content.

Figure 6:
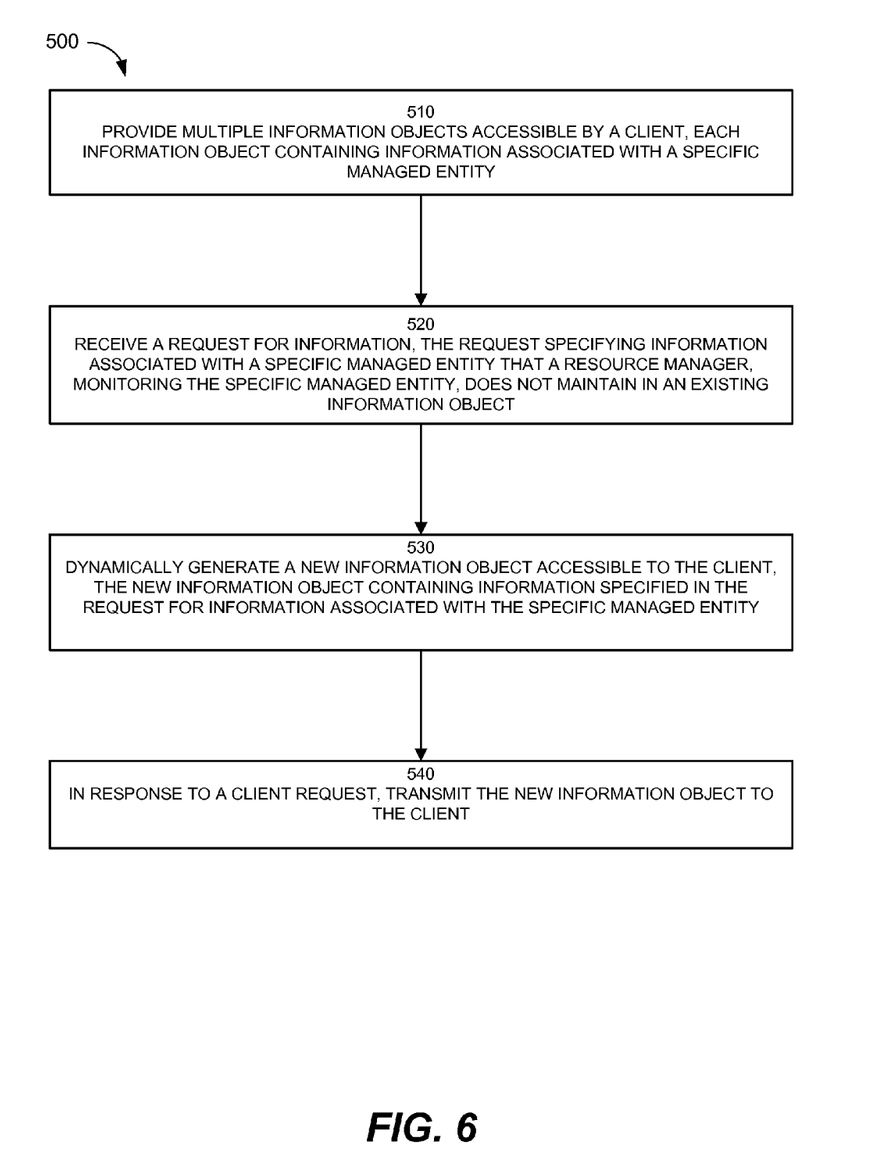
FIG. 6 is a flowchart illustrating an example method for obtaining information on an entity according to embodiments herein.

FIG. 6 is an example flowchart 500 illustrating operations associated with notification manager 140 according to embodiments herein.

In step 510, notification manager 140 provides multiple information objects accessible by a client. Each information object contains information associated with a specific managed entity 185.

In step 520, notification manager 140 receives a request 191 for information. The request 191 specifies information associated with a specific managed entity 185 that a resource manager 144, monitoring the specific managed entity 185, does not maintain in an existing information object.

In step 530, notification manager 140 dynamically generates a new information object 157 accessible to the client. The new information object 157 contains information specified in the request for information 191 associated with the specific managed entity 185.

In step 540, notification manager 140, in response to client 142 request, transmits 197 the new information object to the client 142.

Figure 7:
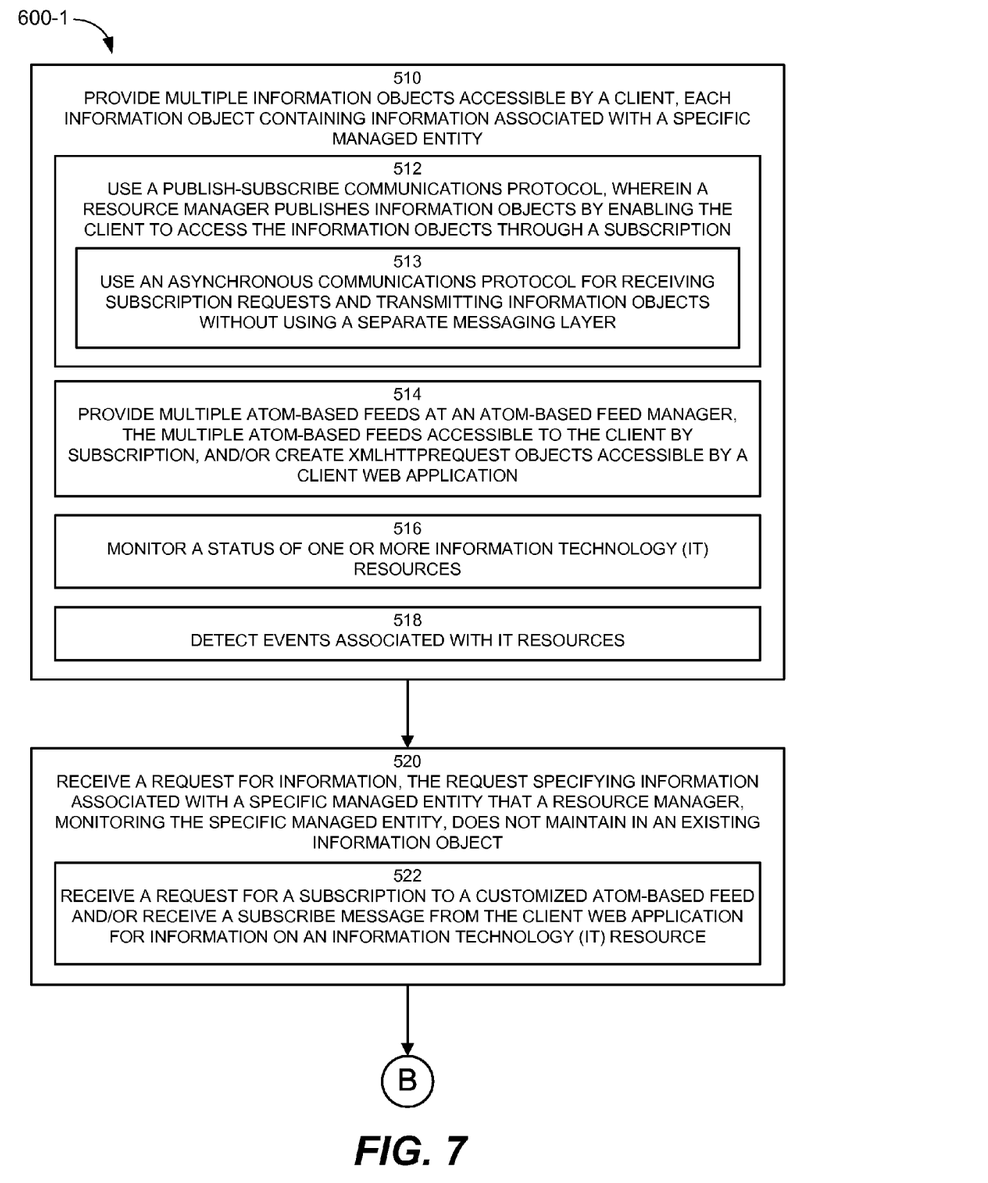
FIGS. 7-8 are a flowchart illustrating an example method for obtaining information on an entity according to embodiments herein.
Figure 8:
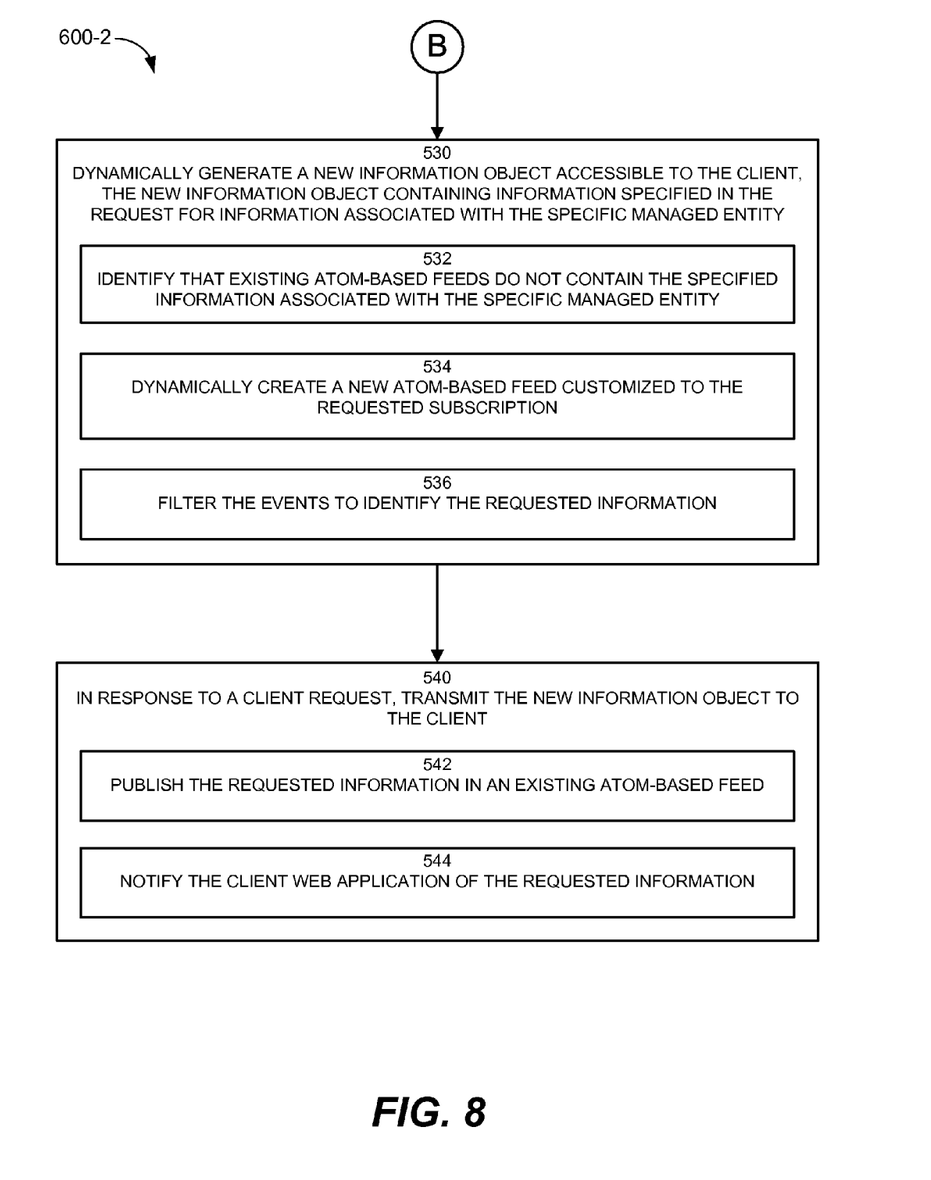

FIGS. 7 and 8 show example flowchart 600 that expands on flowchart 300 by illustrating operations associated with a notification manager according to embodiments herein.

In step 510, notification manager 140 provides multiple information objects accessible by a client. Each information object contains information associated with a specific managed entity 185. In step 512, notification manager 140 uses a publish-subscribe communications protocol, wherein resource manager 144 publishes information objects by enabling client 142 to access the information objects 154 and 157 through a subscription. In step 513, notification manager 140 uses an asynchronous communications protocol for receiving subscription requests and transmitting information objects without using a separate messaging layer.

In step 514, notification manager 140 provides multiple Atom-based feeds at an Atom-based manager. The multiple Atom-based feeds are accessible to client 142 by subscription. Notification manager 140 alternatively creates XML http request objects accessible by client 142 Web application. In step 516, resource manager 144 monitors the status of one or more information technology (IT) resources such as manageable entities 185. Resource manager 144 transmits information request 192 to manageable entities 185. Each manageable entity 185 returns a status, health, performance, and other information represented as 193-1, 193-2, 193-3, and 193-4. In step 518, resource manager 144 detects events associated with IT resources.

In step 520, notification manager 140 receives a request 191 for information. The request 191 specifies information associated with a specific managed entity 185 that a resource manager 144, monitoring the specific managed entity 185, does not maintain in an existing information object. In step 522, notification manager 140 receives a request for a subscription to a customized Atom-based feed, and/or receives a subscribe message from the client 142 Web application for information on and information technology resource, such as a manageable entity 185.

In step 530, notification manager 140 dynamically generates a new information object 157 accessible to the client. The new information object 157 contains information specified in the request for information 191 associated with the specific managed entity 185. In step 532, notification manager 140 identifies that existing Atom-based feeds do not contain specified information associated with the specific managed entity 185. In step 534, notification manager 140, or resource manager 144, dynamically creates a new Atom-based feed customized to the requested subscription. In step 536, notification manager 140 filters the events to identify the requested information 191.

In step 540, notification manager 140, in response to client 142 request, transmits 197 the new information object to the client 142. In step 542 notification manager 140, or resource manager 144, publishes the requested information in an existing Atom-based feed 154. In step 544, notification manager 140 notifies (194 or 197) the client 142 Web application of the requested information.

Those skilled in the art will understand that there can be many variations made to the operations of the data retrieval process and application explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method for obtaining information regarding a managed entity monitored by a server, the method comprising:
generating a request for information, the request for information specifying information associated with the managed entity, the information requested in the request for information not maintained by the server in an existing information object, comprising requesting an XMLHttpRequest object having the specified information associated with managed entity;
submitting the request for information to the server, the server operating a resource manager that identifies that existing XMLHttpRequest objects do not contain the specified information associated with the managed entity and dynamically generates a new information object in response to receiving the request for information not previously maintained by the server in an existing information object, the new information object maintaining information requested in the request for information and made available using a publish-subscribe communications protocol enabling access to the new information object through a subscription; and
receiving the new information object.

2. The method of claim 1, wherein generating the request for information includes:
specifying a pattern of events, associated with the specific managed entity, for receiving notifications; and
requesting a customized information object containing a notification of an occurrence of the specified pattern of events.

3. The method of claim 1, wherein generating the request for information includes:
generating a subscription request to an Atom-based feed, the subscription request describing a type of event, associated with the specific managed entity, that does not exist in current Atom feeds provided by the server.

4. The method of claim 3, wherein generating the subscription request includes:
defining a customized Atom-based feed in response to the subscription request;
wherein operating a resource manager that dynamically generates the new information object includes dynamically generating a new Atom-based feed in response to the subscription request; and
further comprising:
periodically polling the new Atom-based feed for new content.

5. A method for providing information regarding a managed entity monitored by a server, the method comprising:
receiving a request for information specifying information associated with the managed entity, the information requested in the request for information not maintained by the server in an existing information object, the request requesting an XMLHttpRequest object having the specified information associated with managed entity;
identifying that existing XMLHttpRequest objects do not contain the specified information associated with the managaed entity;
dynamically generating a new information object in response to the received request for information not previously maintained by the server in an existing information object, the new information object maintaining information requested in the request for information and made available using a publish-subscribe communications protocol enabling access to the new information object through a subscription; and
transmitting the new information object.

6. The method of claim 5, wherein using the publish-subscribe communications protocol includes:
using an asynchronous communications protocol for receiving subscription requests and transmitting information objects without using a separate messaging layer.

7. The method of claim 5, further comprising:
providing at least one Atom-based feed at an Atom-based feed manager, the at least one Atom-based feed accessible by subscription; and
wherein receiving the request for information includes:
receiving a request for a subscription to a customized Atom-based feed, the request for a subscription describing a type of event, associated with the managed entity, that does not exist in existing Atom-based feeds provided by the feed manager.

8. The method of claim 7, wherein dynamically generating the new information object includes:
- identifying that existing Atom-based feeds do not contain the information, specified in the received request for information, associated with the specific managed entity; and
- dynamically creating a new Atom-based feed customized to the subscription request.

9. The method of claim 8, further comprising:
- detecting events associated with Information Resources (IT);
- filtering the events to identify the requested information; and
- publishing the requested information in an existing Atom-based feed.

10. The method of claim 5, further comprising:
- creating XMLHttpRequest objects accessible by a client web application; and
- wherein receiving the request for information includes:
  - receiving a subscribe message from the client web application for information on an Information Technology (IT) resource.

11. The method of claim 10, further comprising:
- monitoring a status of one or more IT resources;
- detecting events associated with the IT resources;
- filtering the events to identify the requested information; and
- notifying the client web application of the requested information.

12. A computer program product including a non-transitory computer-storage medium having instructions stored thereon for providing information regarding a managed entity monitored by a server that, when carried out by a processing device, enable the processing device to perform the operations of:
- receiving a request for information specifying information associated with the managed entity, the information requested in the request for information not maintained by the server in an existing information object, the request requesting an XMLHttpRequest object having the specified information associated with managed entity;
- identifying that existing XMLHttpRequest objects do not contain the specified information associated with the managed entity;
- dynamically generating a new information object in response to the received request for information not previously maintained by the server in an existing information object, the new information object maintaining information requested in the request for information and made available using a publish-subscribe communications protocol enabling access to the new information object through a subscription; and
- transmitting the new information object.

13. The computer program product as in claim 12, wherein using the publish-subscribe communications protocol includes:
- using an asynchronous communications protocol for receiving subscription requests and transmitting information objects without using a separate messaging layer.

14. The computer program product as in claim 12, further supporting operations of:
- providing at least one Atom-based feed at an Atom-based feed manager, the at least one Atom-based feeds accessible by subscription; and
- wherein receiving the request for information includes:
  - receiving a request for a subscription to a customized Atom-based feed, the request for a subscription describing a type of event, associated with the managed entity, that does not exist in existing Atom-based feeds provided by the feed manager.

15. The computer program product as in claim 14, wherein dynamically generating the new information object includes:
- identifying that existing Atom-based feeds do not contain the information, specified in the received request for information, associated with the specific managed entity;
- dynamically creating a new Atom-based feed customized to the subscription request; and
- further supporting operations of:
- detecting events associated with Information Technology (IT);
- filtering the events to identify the requested information; and
- publishing the requested information in an existing Atom-based feed.

16. The computer program product as in claim 12, further supporting operations of:
- creating XMLHttpRequest objects accessible by a client web application; and
- wherein receiving the request for information includes:
  - receiving a subscribe message from the client web application for information on an Information Technology (IT) resource.

17. The computer program product as in claim 16, further supporting operations of:
- monitoring a status of one or more IT resources;
- detecting events associated with the IT resources;
- filtering the events to identify the requested information; and
- notifying the client web application of the requested information.

* * * * *